United States Patent [19]

Harris et al.

[11] Patent Number: 5,660,058
[45] Date of Patent: Aug. 26, 1997

[54] ACCUMULATOR FOR VEHICLE AIR CONDITIONING SYSTEM

[75] Inventors: Thomas B. Harris, Taylor; Ronald Charles Muir, Whitmore Lake; Norman Henry Dolinski, Grosse Pointe Woods; Chhotubhai Nagarji Patel, Farmington Hills, all of Mich.

[73] Assignee: Ford Motor Company, Dearborn, Mich.

[21] Appl. No.: 552,645

[22] Filed: Nov. 3, 1995

[51] Int. Cl.⁶ .................................................. F25B 43/02
[52] U.S. Cl. ................................................ 62/471; 62/503
[58] Field of Search ........................... 62/503, 474, 468, 62/469, 470, 471, 473

[56] References Cited

U.S. PATENT DOCUMENTS

| | | |
|---|---|---|
| 3,084,523 | 4/1963 | Bottum et al. . |
| 3,643,465 | 2/1972 | Bottum . |
| 3,872,689 | 3/1975 | Bottum . |
| 4,182,136 | 1/1980 | Morse . |
| 4,474,035 | 10/1984 | Amin et al. ................... 62/503 |
| 4,528,826 | 7/1985 | Avery, Jr. ..................... 62/503 |
| 4,827,725 | 5/1989 | Morse . |
| 5,179,844 | 1/1993 | Lyman et al. ................. 62/503 |
| 5,191,775 | 3/1993 | Shiina et al. .................. 62/503 |
| 5,347,829 | 9/1994 | Newman ........................ 62/474 |

FOREIGN PATENT DOCUMENTS

| | | |
|---|---|---|
| 52-51147 | 4/1977 | Japan . |
| 1219887 A | 3/1986 | U.S.S.R. . |
| 2 159 259 | 11/1985 | United Kingdom . |

*Primary Examiner*—Harry B. Tanner
*Attorney, Agent, or Firm*—Raymond L. Coppiellie

[57] ABSTRACT

There is disclosed herein an accumulator for an automotive air conditioning system. The accumulator includes a sump for collecting oil to be provided to the air conditioning compressor. There is also disclosed an outlet tube in the accumulator, the tube having a flange opening and a necked-down portion a predetermined distance from the flange opening.

3 Claims, 1 Drawing Sheet

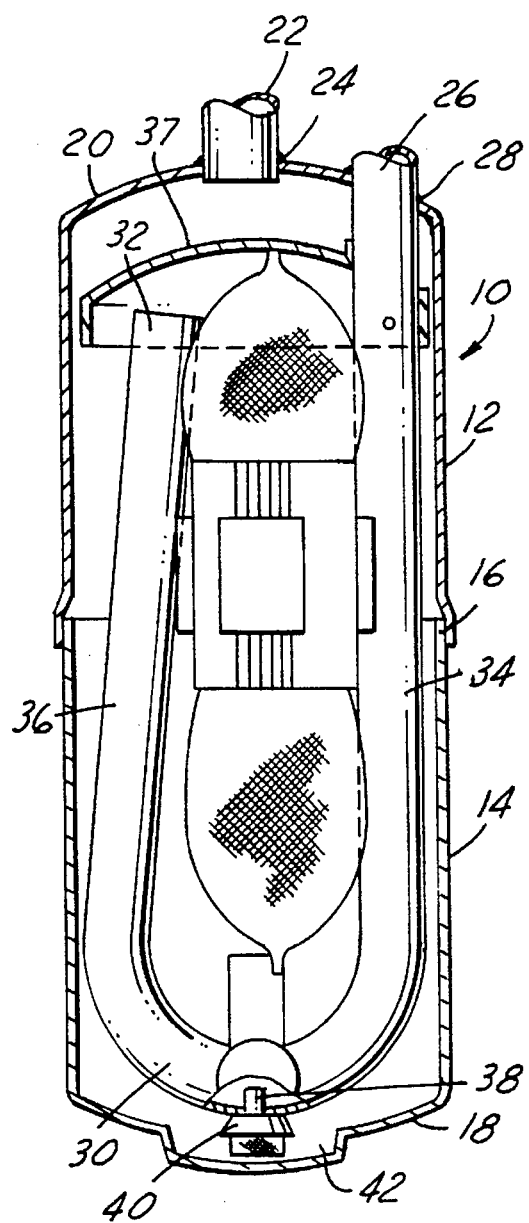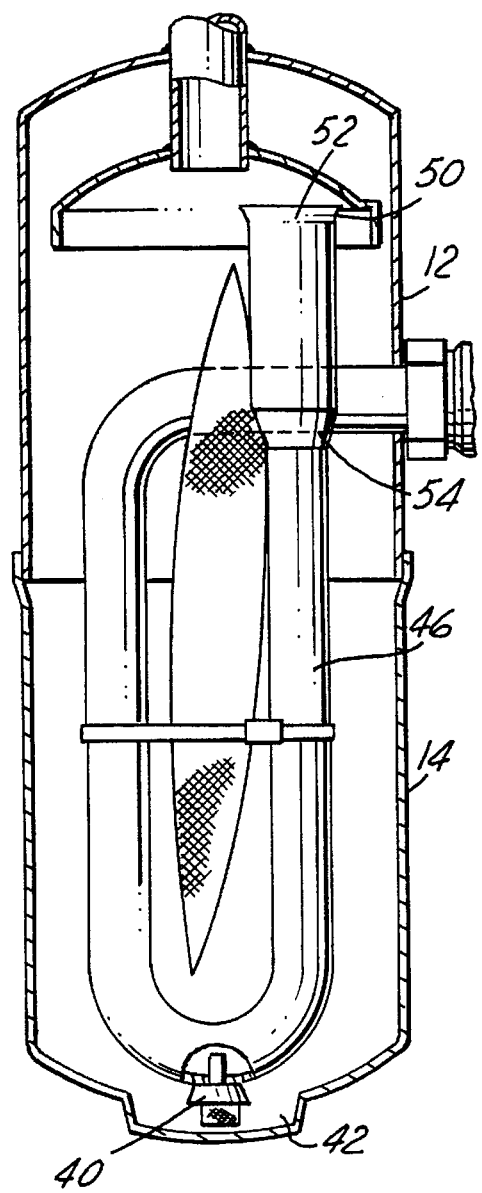

ACCUMULATOR FOR VEHICLE AIR CONDITIONING SYSTEM

FIELD OF THE INVENTION

The present invention relates generally to an accumulator for an automotive air conditioning system. More particularly, the present invention relates to an accumulator which provides increased oil supply to the compressor under normal operating and low charge conditions.

DISCLOSURE INFORMATION

A vehicle air conditioning system conventionally includes a compressor, a condenser, a refrigerant control device, an evaporator and an accumulator arranged as a refrigerant circuit. The compressor compresses the refrigerant for delivery to the condenser, where the state of the refrigerant changes from gaseous to liquid. The refrigerant then passes through the refrigerant control device to the evaporator, where an air blower circulates air over the evaporator to the vehicle passenger compartment. The resulting heat transfer from the ambient air to the evaporator causes the refrigerant to mostly change state from a liquid to a gas.

Liquid and gaseous refrigerant then pass from the evaporator to the accumulator. The accumulator separates the liquid refrigerant from the gaseous refrigerant, allowing only gaseous refrigerant to return to the compressor. The residual liquid refrigerant eventually turns to a gaseous state and is then returned to the compressor. The accumulator also provides for recovery of lubricating oil contained in the refrigerant and for returning a metered amount of the oil to the inlet side of the compressor.

The accumulator normally comprises an upright cylindrical housing with an inlet opening formed therein and an outlet tube having its mouth in the upper interior region of the accumulator. Refrigerant from the evaporator is introduced into the accumulator through the inlet opening, which may be in the top or in the side of the accumulator housing. The liquid refrigerant settles to the bottom of the accumulator. Gaseous refrigerant rises to the top of the accumulator, where suction by the compressor draws the gaseous refrigerant through the outlet tube.

During a low charge/low oil system condition in the refrigerant circuit, the compressor can be damaged if the volume of oil returned to the compressor is too low. Oil is used to lubricate the swashplate or other moving members within the compressor. Typically, the outlet tube of the accumulator includes the metering or oil return orifice located at the bottom of the outlet tube adjacent the bottom of the accumulator housing for drawing oil pooled along the bottom of the accumulator into the tube which passes the oil to the compressor. However, in a low charge condition, the volume of oil may be low as well. If the oil is displaced along the base of the accumulator, there may not be sufficient suction through the outlet tube to draw a sufficient quantity of oil into the compressor, thus leading to possible compressor damage.

Therefore it would be advantageous to provide an accumulator which provides efficient pooling of oil in the accumulator to increase the amount of oil returned to the compressor when a low charge condition occurs in the air conditioning system.

SUMMARY OF THE INVENTION

It is an object of the present invention to provide an accumulator which insures oil supply to the air conditioning compressor when a low charge condition exists in the system. The present invention provides a suction accumulator for the compressor of an automotive air conditioning system, comprising a housing having an upper portion, a lower portion, an inlet in the upper portion and an outlet. The accumulator further includes a sump disposed in the lower portion of the housing as well as a conduit disposed in the housing which is in fluid communication with the inlet, the sump and the outlet. The conduit includes a metering orifice proximate the sump. The accumulator also include a filter connected to the metering orifice and extending into the sump.

In one embodiment, the conduit includes an inlet opening having a flange portion therearound and a necked-down portion disposed a predetermined distance from the inlet opening. The diameter of the flange portion is greater than the diameter of the necked-down portion.

It is an advantage of the present invention to provide increased oil supply to the compressor during a low charge condition in the air conditioning system by providing an area in the accumulator for oil to collect efficiently.

BRIEF DESCRIPTION OF THE DRAWINGS

FIG. 1 is a cross-sectional view of an accumulator structured in accord with the principles of the present invention.

FIG. 2 is a cross-sectional view of an alternative embodiment of an accumulator of the present invention.

DETAILED DESCRIPTION OF THE PREFERRED EMBODIMENTS

Referring now to the drawings, FIGS. 1 and 2 show two embodiments of accumulators of the present invention for use in an automotive air conditioning system of the type known in the art and such as disclosed in U.S. Pat. No. 4,474,035, the disclosure of which at column 2, lines 30-column 4, line 10 is hereby incorporated by reference. As is well understood to one of ordinary skill in the art, but not shown in the drawings herein, an air conditioning system includes a compressor, the output of which flows to a condenser through a liquid line, through a refrigerant control device to an evaporator and then to the accumulator of the present invention. From the accumulator, the refrigerant is returned to the compressor. As is show in FIG. 1, the accumulator includes a generally cylindrical, vertically disposed housing 10 comprising an upper portion 12 an a lower portion 14. The portions 12 and 14 are joined together in abutting relationship at a predefined seam location 16 by means of an overlapping brazed or welded juncture. The lower portion of the accumulator is closed by a lower wall 18, and the upper and of the accumulator is closed by a domed upper wall. An inlet tube 22 is received within an opening formed at the center of the domed wall 20 and is brazed at 24. An outlet tube 26 extends through another opening in the domed wall 20 adjacent to inlet tube 22, and it too is brazed to provide a pressure seal and a permanent juncture with the wall 20 as shown at 28.

Outlet tube 26 extends vertically adjacent the inner wall of the accumulator and is curved at its lowermost portion 30, the curved portion 30 being situated in the lowermost region of the accumulator adjacent to lower wall 18. The tube 26 includes a first pipe portion 34 and a second pipe portion 36 interconnected by the curved portion 30 and extends upwardly from the curved portion 30 to its inlet point 32. The inlet of the tube at point 32 is located within the curve of the domed baffle 37 such as shown in U.S. Pat. No. 4,474,035.

At the base 18 of the accumulator lower portion 14 there is located in oil return orifice 38 and filter assembly 40. The filter assembly 40 is disposed in a centrally located sump 42 located in the wall 18 of the lower portion of housing 10. The wall 18 is generally circular and canted slightly toward the radial center of the base. The sump 42 is located at the radial center position of he base 18 so that oil carried in the liquid/gas refrigerant is directed thereto. The base and sump 42 are formed as a one piece unit. In the preferred embodiment, the entire lower portion 14 of the housing 10, including the sump 42 is formed as a one piece unit. The sump 42 collects oil included with the liquid/gaseous refrigerant entering the accumulator. The oil in the sump 42 is drawn through filter assembly 40 and oil return orifice 38 into the outlet tube 26 and ultimately to the compressor. By providing a sump 42, more oil can be introduced into the refrigerant mixture, increasing the amount of oil which is introduced into the outlet tube 26 and into the compressor such that during a low charge condition, an appropriate amount of oil reaches the compressor and prevents the compressor from being damaged.

FIG. 2 shows an alternative embodiment of the present invention wherein the outlet tube 46 includes a flange opening 50 surrounding the inlet 52 of the outlet tube 46. The accumulator of FIG. 2 is essentially identical to that of FIG. 1 and like elements have been given like reference numerals. The outlet tube 46 further includes a necked-down portion 54 located a predetermined distance from the flange opening 50. The diameter of the necked-down portion 54 is less than the diameter of the flange opening 50 but is greater than the diameter of the outlet tube. The flange opening 50 and the necked-down portion 54 create a double venturi-like effect on the refrigerant entering the outlet tube 46. This double venturi-like effect increases the velocity of the flow of refrigerant through tube 46, causing an increased suction at the oil return orifice 38 and filter assembly 40 to increase the amount of oil drawn from the sump 42 into the outlet tube 46. As a result, a more consistent refrigerant flow and oil flow to the compressor is achieved. The accumulator of FIG. 2 is similar to that shown in FIG. 1 except that the outlet is through the cylindrical wall of upper portion 12 instead of through the top wall 20.

It should be apparent that many variations and modifications of the present invention are possible without departing from the spirit and scope of the present invention. It is the following claims, including all equivalents which define the scope of the present invention.

What is claimed is:

1. A suction accumulator for the compressor of a automotive refrigeration system, comprising:

a generally cylindrical, vertically upright housing having an upper portion including an inlet and an outlet opening, and a lower portion having a generally circular base, the base being canted toward a radially defined center;

an oil collecting sump disposed at the radially defined center of the base of the lower portion of the housing;

a conduit disposed within the housing and being in fluid communication with the inlet opening, the sump and the outlet opening, the conduit including an inlet end having a flange portion therearound and a necked-down portion disposed a predetermined distance from the conduit inlet end, the conduit further including an oil return orifice proximate the sump; and a filter fluidly connected to the oil return orifice and extending into the sump, whereby the conduit draws gas through the inlet opening and draws oil collected in the sump through the filter into the oil return orifice and expels both gas and oil through the outlet into the compressor.

2. A suction accumulator according to claim 1, wherein the circumferential flange portion and the necked-down portion are operative to create a double venturi for refrigerant flowing through the conduit.

3. A suction accumulator according to claim 1, wherein the base portion and the sump are a one piece member.

* * * * *